July 18, 1939.  W. F. MARTIN  2,166,845
CALCULATING MACHINE
Filed Oct. 5, 1936  6 Sheets-Sheet 1

INVENTOR.
WILLIAM F. MARTIN
BY Charles R. Werner
ATTORNEY.

INVENTOR.
WILLIAM F. MARTIN
BY Charles R. Werner
ATTORNEY.

July 18, 1939.   W. F. MARTIN   2,166,845
CALCULATING MACHINE
Filed Oct. 5, 1936   6 Sheets-Sheet 5

INVENTOR.
WILLIAM F. MARTIN
BY Charles R. Werner
ATTORNEY.

July 18, 1939.  W. F. MARTIN  2,166,845
CALCULATING MACHINE
Filed Oct. 5, 1936  6 Sheets-Sheet 6
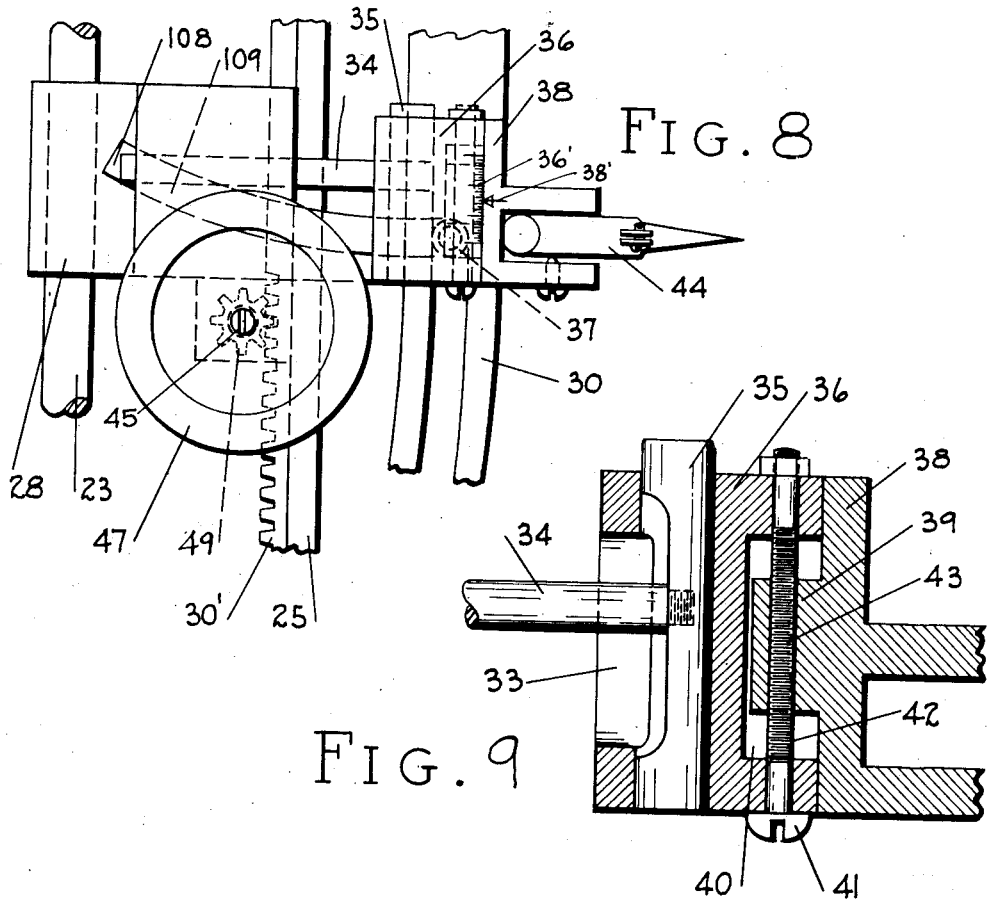
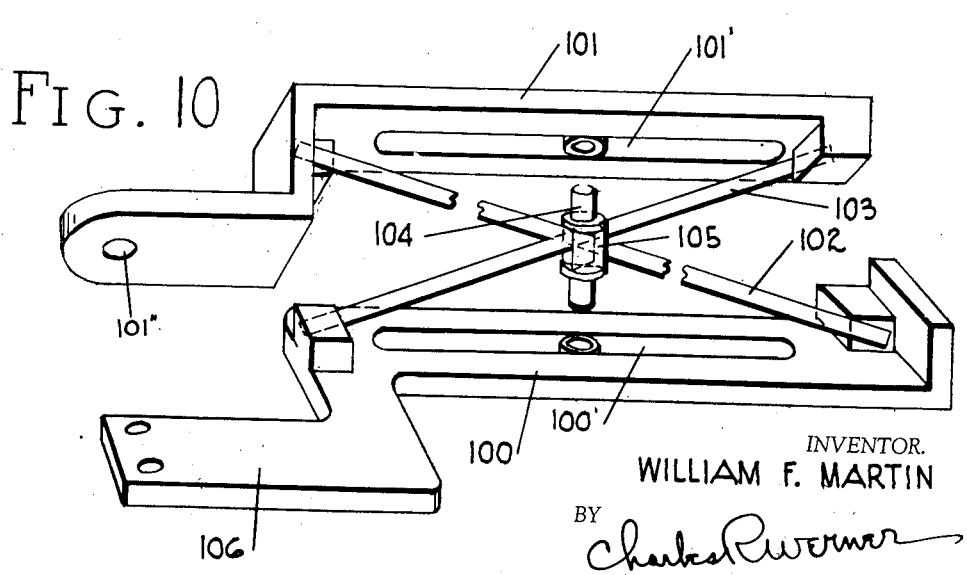
INVENTOR.
WILLIAM F. MARTIN
BY Charles R. Werner
ATTORNEY.

Patented July 18, 1939

2,166,845

UNITED STATES PATENT OFFICE 2,166,845

CALCULATING MACHINE

William F. Martin, Amarillo, Tex.

Application October 5, 1936, Serial No. 104,007

37 Claims. (Cl. 235—61)

This invention relates to an orifice meter chart calculating machine, and the primary object of the invention is to provide a mechanical calculator which can be operated to accurately designate the cubic feet of fluid passing a given point in a given time so that an operator may determine how much fluid has been delivered from a source of supply.

Prior to my invention the amount of fluid, for example, gas, which has passed a given point during a given time was measured by an orifice meter which indicated on a chart a static or upstream pressure line and a differential line which indicated the difference in pressure between the upstream pressure and the downstream pressure.

In order to calculate the cubic feet of gas delivered through the meter it was necessary to take the square root of the average static and the square root of the average differential and multiply the two together for each hour to obtain what is commonly known as the hourly extension. This is repeated for each succeeding hour, then the products for each hour are added; then there is applied the hourly coefficient for the particular meter considered, the result being the cubic feet of gas passing through the meter represented by the chart, subject to corrections for gravity, temperature and supercompressibility. In following the above method errors are not infrequent.

Where great irregularity appears in static and differential chart lines it is necessary to calculate these "extensions" much more frequently than where they are comparatively regular. Sometimes the "extension" calculations are made as often as four times an hour, so then there would be ninety-six calculations to be made every twenty-four hours, calculations being further complicated by one-fourth of the square root of the differential.

It is the purpose of my invention to eliminate the liability of human errors and expedite the solution of these calculations by mechanical means so that the operator will be sure that the indicated result will be correct.

In order to understand the novelty of my invention, reference should be had to the following description in connection with the accompanying drawings in which:

Fig. 8 is an enlarged fragmentary plan view of a modified form of stylus assembly.

Fig. 9 is an enlarged detailed sectional view on the line 9—9 of Fig. 7, and

Fig. 10 is a disassociated view of the multiplying motion correction device.

Figure 1:
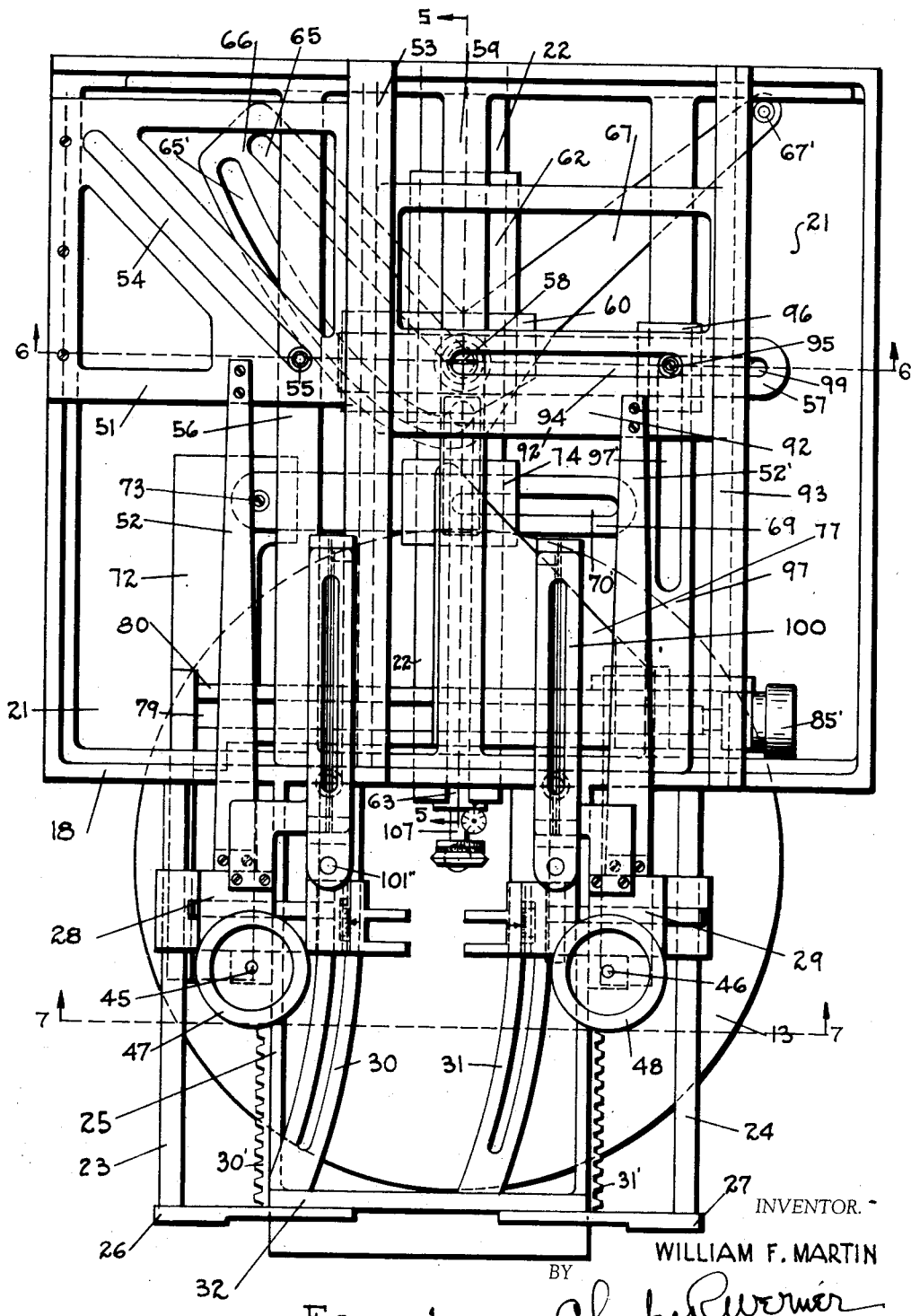
Fig. 1 is a top plan view of the complete machine.

Referring now to the drawings by numerals of reference 11 designates a rectangular base frame, preferably supported by legs 12. The base frame is provided with an extension on which is mounted a rotatable chart receiving table 13 having a vertical shaft 14 driven from a motor 15 by suitable reduction gearing 16. The perimeter of the table 13 is provided with a notched portion 17 to be engaged by a detent to be referred to hereinafter.

Superposed upon the base frame 11 is a second frame 18 which for convenience may be hinged to the base frame 11 at 19. The frame 18 is provided at the front end with legs 20 which rest upon the base frame 11. The frame 18 is provided with a floor 21 below the top thereof, and this floor 21 and frame 18 support certain parts to be described hereinafter.

The reference numeral 22 designates a guide bar fastened to the floor 21, and if desired it may be fastened at the back frame bar, but between the front bar of the upper frame and the guide bar is a space to permit movement of the multiplying member which will later be described in detail.

The guide bars 23 and 24 projecting from the front of the frame 18 have their forward ends connected to a rectangular frame 25 by brackets 26 and 27, and they carry the stylus blocks 28 and 29 which are also supported by the racks 30 and 31 which are part of the frame 25. The two stylus blocks 28 and 29 are duplicates, except that one is right-hand and the other left-hand. The arcuate slotted bars 30 and 31 are each connected to the frame 18 at one end and to the front bar 32 of the frame 25 at the other.

Figure 7:
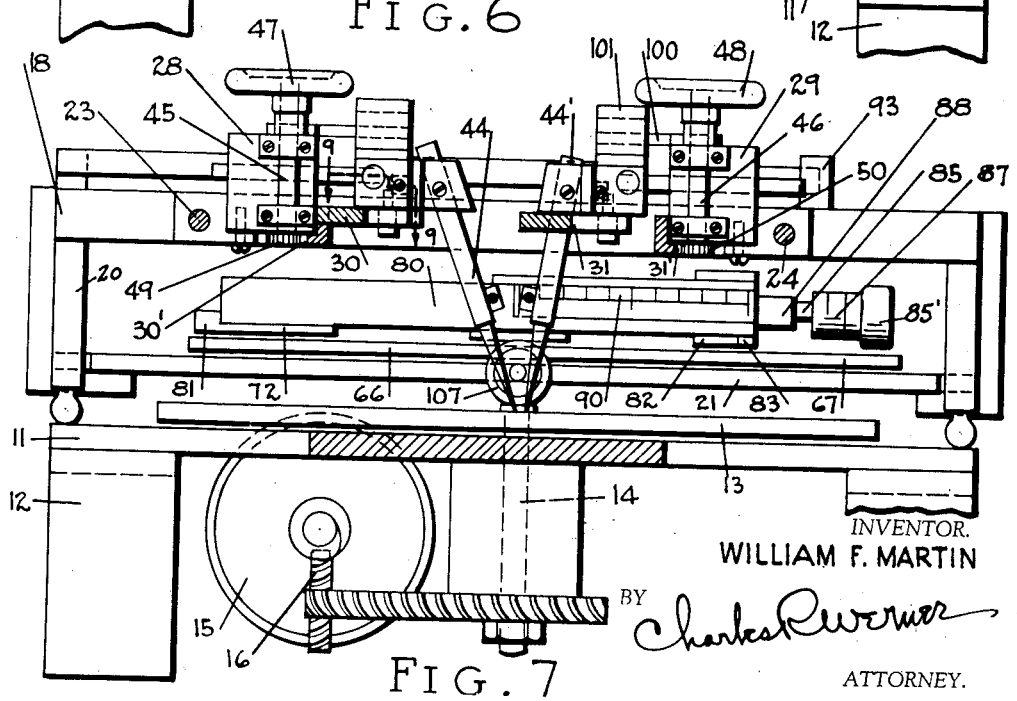
Fig. 7 is a vertical cross sectional view on the line 7—7 of Fig. 1.

Each stylus block is shown as having a guide opening 33 to receive a sliding pin 34, which pin is connected rigidly to a slide bar 35 movable at right angles to the axis of the pin in the stylus head 36. See Fig. 9. The bottom of the head 36 carries a roller 37 which rides in the slot in the arcuate bar with which it functions. Each head is provided with a sliding stylus carrier 38 which is mounted for fore and aft movement, but held against swerving movement with respect to the head, because the two abutting faces of the head and the slide are on the same straight plane, but the slide has a tongue 39 which is received in a recess 40 in the main portion of the head. An adjuster screw 41 has a threaded portion 42 which engages an internally threaded opening 43 in the tongue 39, the remaining portions of ends of the screw being unthreaded so that when the screw is turned the part 38 will slide in the direction controlled by the screw. One of the parts 36 or 38 may have a calibrated scale 36', while the other is provided with a pointer 38' to indicate the degree of sliding movement imparted to the carrier 38. The carrier 38 is also provided with a bifurcated portion to receive a stylus 44 or 44' as the case may be, the stylus being effective to supply ink, pencil marks or the like over the lines on the chart so there will be a record of how closely the styli have followed the lines on the chart. The adjustment of the stylus carrier is to compensate for errors made in the meter recording from whatever cause. The stylus blocks 28 and 29 carry vertical shafts 45 and 46 on which are mounted hand wheels or knobs 47 and 48 so that the shafts can be rotated, (see Fig. 7), and inasmuch as the shafts carry pinions 49 and 50 which engage the rack bars 30' and 31', the rotation of the shafts will cause the stylus blocks to move forward or backward and cause the heads to move in the slots of the arcuate bars which cause the heads to move in arcs so that the styli will follow the curves of the time lines on the chart. Of course it is understood that the slotted bars 30 and 31 are interchangeable so that arcuate bars with proper curves can be used to conform to the particular chart used.

Figure 2:
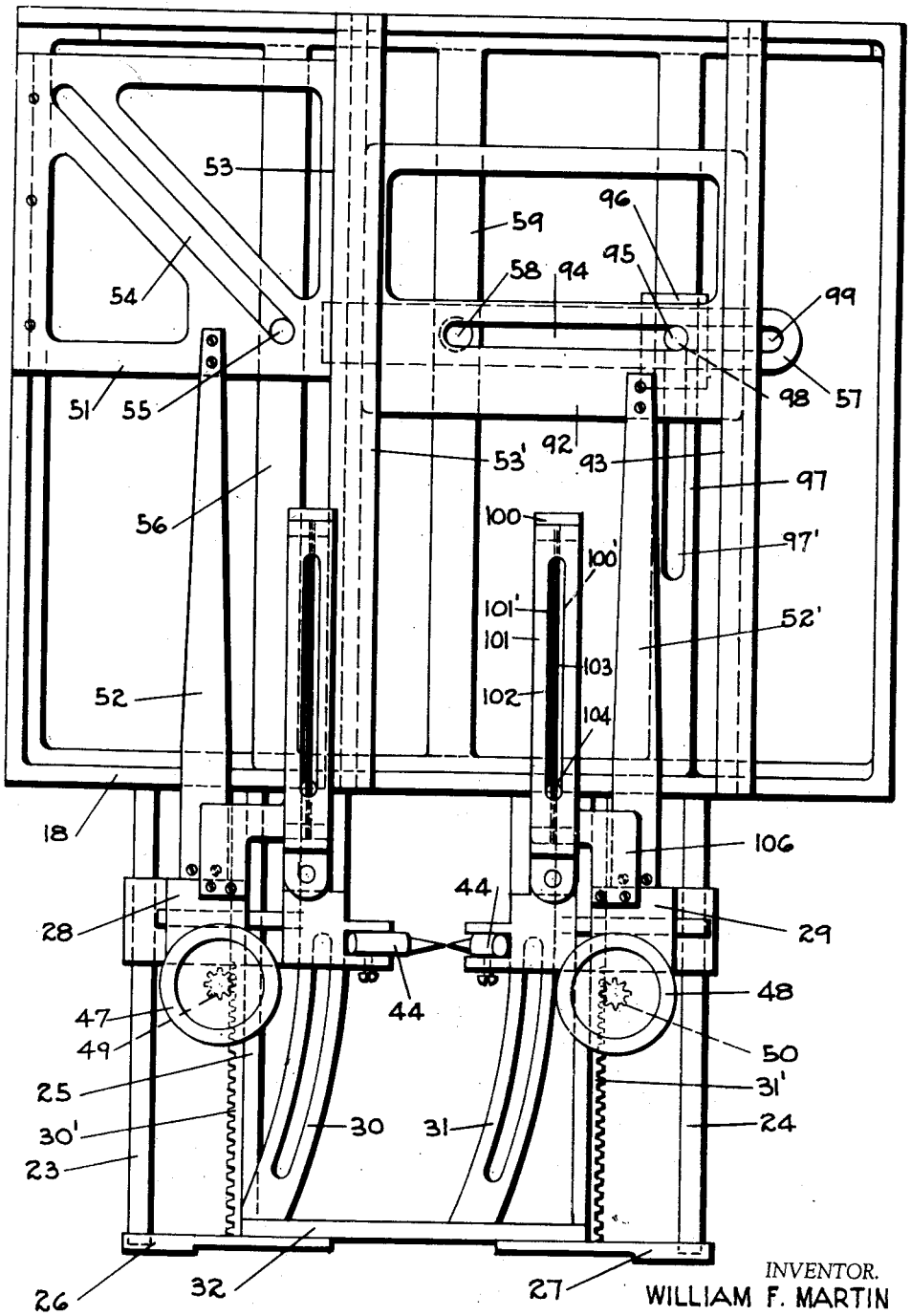
Fig. 2 is a plan view of the upper frame and the parts associated therewith.
Figure 6:
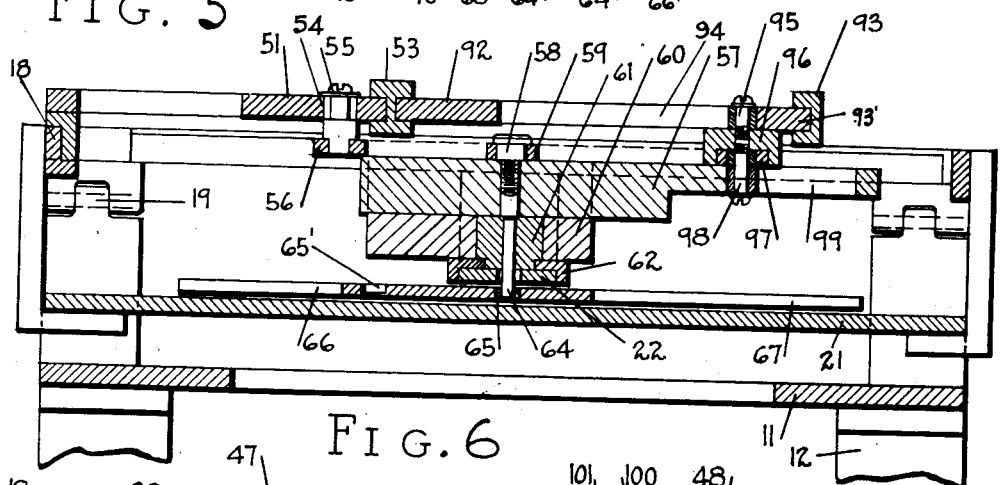
Fig. 6 is a vertical cross sectional view on the line 6—6 of Fig. 1.

The stylus block 28 is rigidly connected to a longitudinally movable frame 51 by a link bar 52. The frame 51 is held against sidewise movement on one side by the side of the frame 18 and at the other by a guide bar 53. (See Figs. 1, 2, and 6.)

Figure 5:
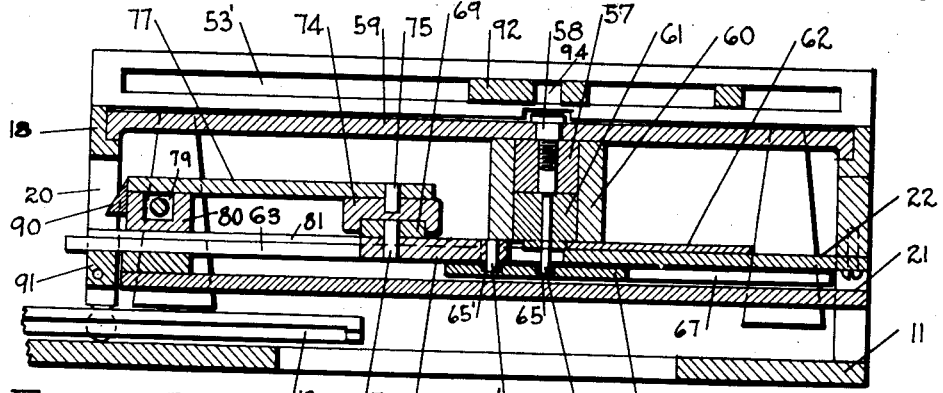
Fig. 5 is a fragmentary, vertical sectional view on the line 5—5 of Fig. 1.

The frame 51 has a diagonal slot 54 which receives a pin 55 with a roller on it to reduce friction, the pin 55 being carried by a transversely movable frame 56 which rides in guides on the front and rear rails of the frame 18 so that the frame can slide in two directions across the frame 18, below frame 51. The frame 56 carries a multiplying bar or member 57, (see Figs. 5 and 6), which is pivoted intermediate its ends at 58 to the intermediate bar 59 on frame 56, and the elongated multiplying bar 57 has longitudinal movement in the trough-shaped guide 60 pivotally mounted upon a stud bearing 61 mounted on longitudinally movable slide 62 mounted in fixed guide 22. A roller 64 in axial alignment with the stud bearing 61 engages in a straight slot or groove 65 in square root extracting member 66 which is L-shaped and has one leg 67 pivoted at 67' to the floor 21 of the frame 18, the other leg having the groove 65 in which the roller 64 rides. The same leg which is provided with the groove 65 is also provided with a cam groove 65' which receives a roller on a sliding link bar 68 which is connected to the bar 69 by pin 70 movable in slot 70', the bar 69 being pivoted to the bracket 72 at 73. The inverted U-shaped block 74 rides on top of bar 69. To the top of the block 74 is secured a pin 75 which is received in the opening 76 in the triangular plate 77 and the triangular plate is carried by a slide 78 riding in the transverse groove 79 of the bar 80 which rides longitudinally of the machine on two guides 81 and 82. One end of the bar 80 abuts guide 81 and the other end of bar 80 has a flange 83 longer than the width of the bar to overlap the guide 82. The triangular plate 77 has a downwardly extending lug or extension which is received in the groove, and it is provided with a threaded opening 84 to receive a threaded portion of an adjusting screw 85. A bracket 86 carried by the grooved bar 80 is provided with a bearing 87 to receive the unthreaded part of the adjusting screw 85, the collar 88 on the screw preventing longitudinal movement of the screw so that when knob 85' and the screw 85 is turned the plate 77 and the guide 78 will be moved transversely of the machine in the longitudinal slot 79 of the bar 80. One flange of the grooved bar 80 carries a calibrated scale 90 which cooperates with the pointer 89 on the plate 77 to indicate in conjunction with the scale on wheel and vernier the degree of adjustment of the plate, and therefore the degree of adjustment of bar 69. On the underside of the cross bar 80 and transverse to it is a slide 91 which operates in slot 63 of guide bar 22.

The stylus block 29 by means of arm 52' is rigidly connected to plate 92 slidable in guides provided on one edge by the rail 93 with a groove 93' and at the other by the groove 53' in guide 53. The plate 92 is provided with a slot 94 to receive the roller 95 on an inverted U-shaped block 96 riding on one end rail 97 of the sliding frame 56. The rail 97 is slotted at 97' to receive a roller 98 on its pin on the underside of the block 96. The roller 98 rides in a slot 99 in the multiplying bar 57.

In Fig. 10 I have shown a motion correction device consisting of two slotted bars 100 and 101 tied together by flexible metallic tapes 102 and 103 passing through the slot 105 in pin 104, the pin has convex curved sides and the ends of the tapes are secured to the center lines of the ends of the respective bars 100 and 101 and the bars lie close together one upon the other, the bar 100 being the bottom bar and is rigidly attached to the stylus block 29 by the offset 106. The top bar 101 is pivotally attached to the stylus head of block 29 by a loose connection at 101''. The pin 104 passes through the slots 100' and 101' in the respective bars and it is shown in detail in Fig. 10. The lower end of the pin is rigidly connected to a bracket or other support on frame 18. When the block 29 is moved outwardly the tape 103 is in tension and pulls bar 101 with it to a distance slightly less than the travel of the block 29 and correspondingly the head moves a distance slightly less than the travel of the block. The purpose of this is to insure radial travel of the stylus in direct proportion to the movement of the block. Of course the reverse movement of the block will cause tension to be put on tape 102 to move bar 101 inward to retract stylus head.

The compensating device shown in Fig. 10 will be applied to block 28 and its stylus head in the same manner as just described, except that one will be right-hand and the other left-hand.

Fixed to the lower end of slide 91 is a counter or indicator 107 which is movable out over the table and chart to indicate the quantity of fluid which has passed through the meter, record of which is shown on the chart. The indicator may be of approved type such as is used on planimeters and other measuring instruments, so its details of construction need not be described here.

In Fig. 8 I have shown a modified form of stylus block and head, the head being provided with curved arm 108 which slides in an arcuate groove 109 in the block so that the head moves away from the block in a predetermined arc. This modified mechanism is to be used in all instances where the chart is calibrated on the time arc rather than on a straight line.

In practice I have found that where the chart is calculated on a straight line a mathematically correct result is not possible, because where the assumption is that the chart is calibrated on a straight line and the fluid is computed accordingly there will be a slight error in the result, whereas by using the mechanism shown in Fig. 8 a true result will be indicated.

The arc of groove 109 is identical with the time arc on the chart. The angle at which groove 109 is set in block is ascertained by swinging a compass with a spread equal to the radius of time arc from the outer end of the time arc and then swinging the compass with the same spread from the outer end of a straight line the exact length of the time arc to ascertain the point at which these two lines cross, then drawing a line from the point of crossing to the outer end of the straight line referred to. This latter line will indicate the exact angle at which the arc is to be set in blocks 28 and 29.

Figure 3:
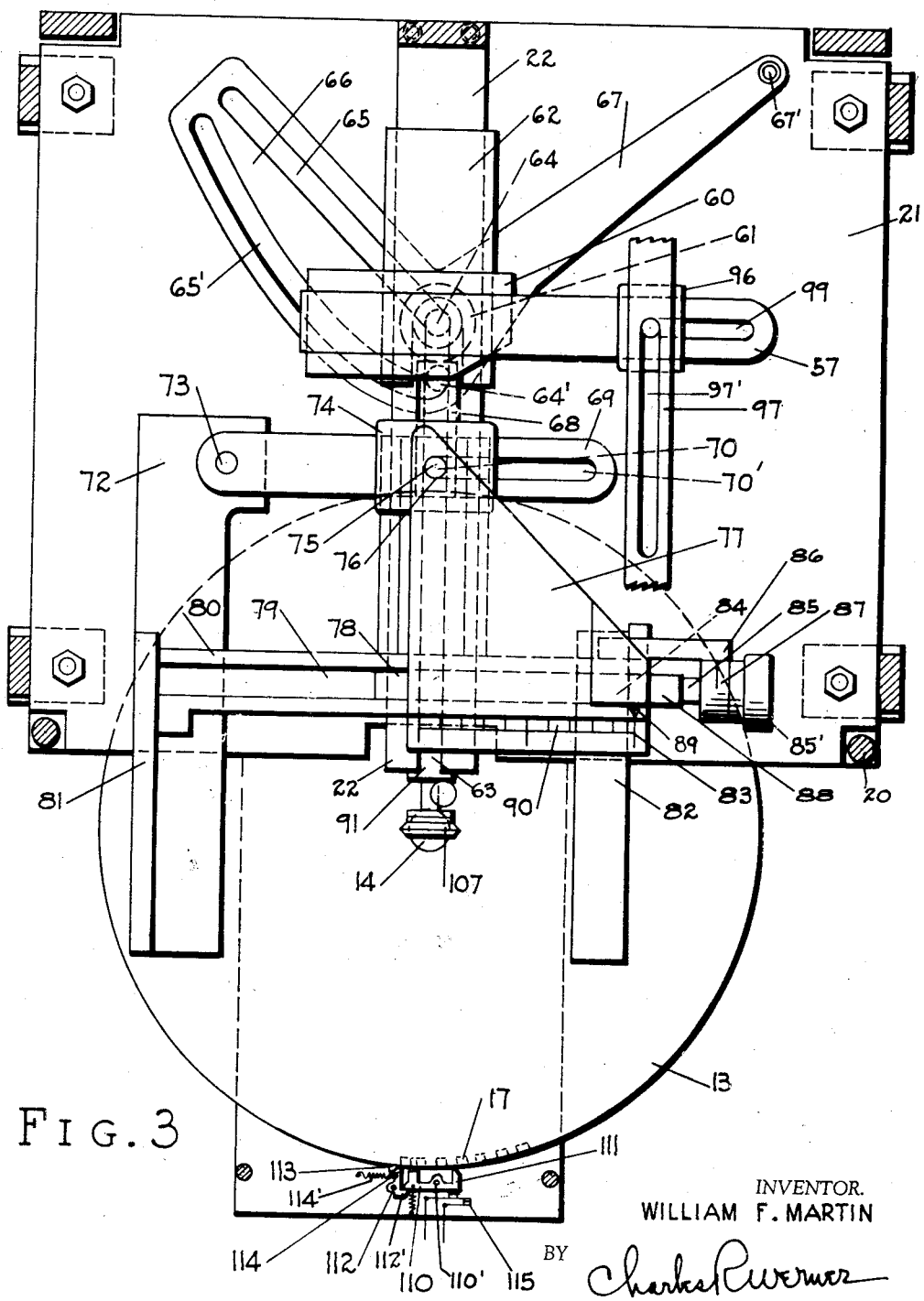
Fig. 3 is a plan view with the top removed.
Figure 4:
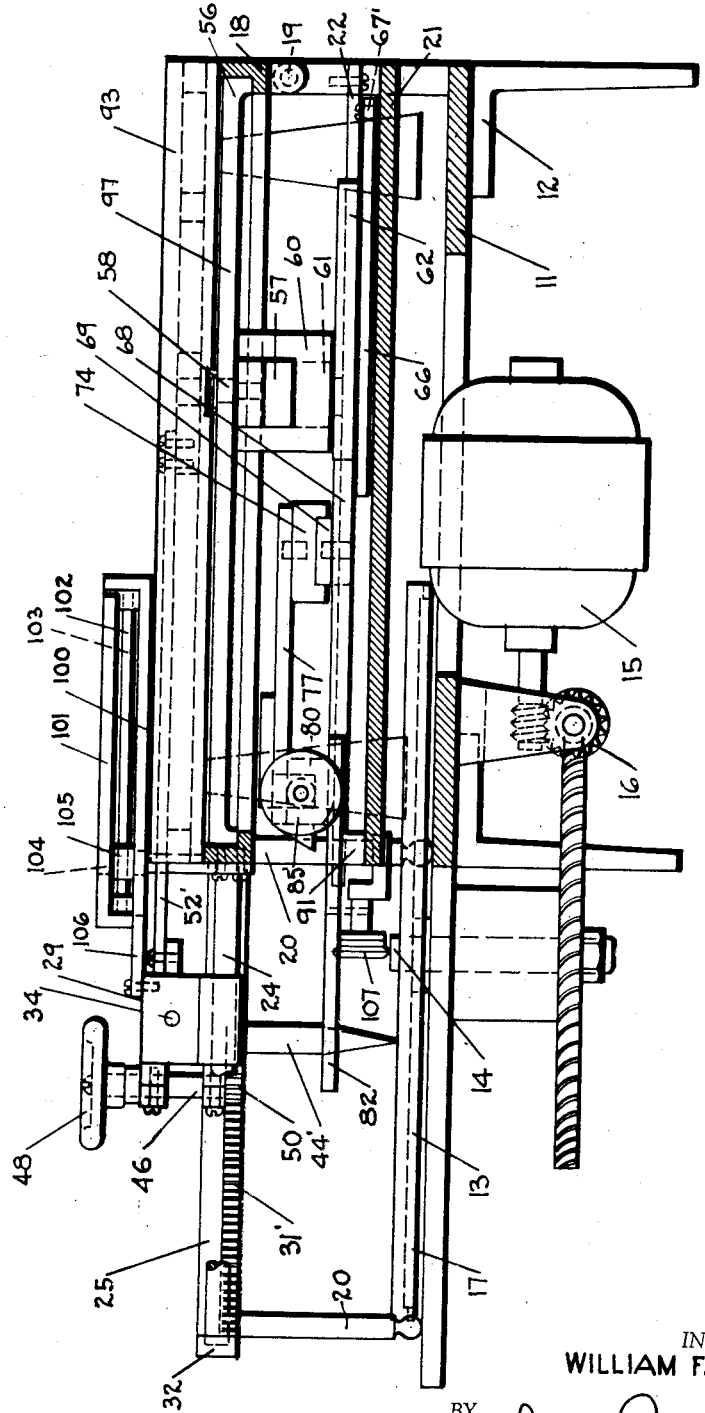
Fig. 4 is a vertical sectional view.

In Fig. 3 I have shown means to prevent turning of the table beyond one complete revolution. The means shown consists of a pivoted U-shaped dog 110 having a tooth 111 to engage between the projections on table, the dog being pivoted at 110' and adapted to be urged into table engaging position by the spring 111'. The dog 110 is normally retained in disengaged position by projection 112' on detent 114 pivoted at 112 and urged into retaining position by spring 114'. A cam 113 is provided on the rotating table 13 and at each complete revolution of said table the cam will engage the detent 114 to trip the dog 110 allowing tooth 111 to engage teeth or projections on the table. Contacts 115 in an electrical circuit in which motor 15 is connected are broken and the motor stops.

It is understood that the table can be provided with a suitable friction surface to prevent the chart from turning thereon and that suitable means may be provided, such as a jack structure or counter balance, to lift the front end of the frame 18 to permit insertion and removal of the chart from the table.

Operation

When all the parts are assembled in operative position, the operator, after observing the coefficient on chart and adjusting the coefficient mechanism which comprises the adjusting means controlled by knob 85' which changes the relation between the plate 77 and the bar 80, the desired position being indicated by scale 90 and pointer 89. When the coefficient mechanism is set, the upper part of the machine comprising mainly the frame 18 and the floor 21 and the mechanism carried thereby, is raised so that the orifice meter chart can be placed on the rotatable table, the upper part of the machine being lowered to normal position thereafter.

The operator, by means of knobs 47 and 48 which control the movement of the styli 44 and 44', positions said styli on the lines which have been recorded on the orifice meter chart during its period on the orifice meter gauge. After the electric motor 15 is started and the table 13 is revolving slowly the operator endeavors to follow closely the lines on the orifice meter chart with the styli. One stylus will follow the static pressure line and the other stylus will follow the differential line.

The transmission of movement from one stylus will be first followed and then the movement of the other stylus will be described.

Fore and aft movement of the stylus 44 will impart a corresponding movement to frame 51, forward movement of which causes frame 56 to move to the left and rearward movement of which causes frame 56 to move to the right, the amount of movement of frame 56 being the same as the fore or aft movement of the frame 51 or the stylus 44. The multiplying bar 57 pivotally connected to frame 56 at member 59 moves therewith in trough shaped guide 60 which, through roller 64 in groove 65 will cause square root extracting member 66 to swing on its pivot 67' urging slide member 62 to move fore or aft on fixed guide 22. Movement will be imparted to member 66 only when multiplying bar is in multiplying position which is at any time that pivot 58 is not aligned with pivot or roller 64. Movement of member 66 will cause roller 64' riding in arcuate slot 65' and carried by link bar 68 to move in slot 63 of member 22, said bar 68 being slidably connected to pivoted bar 69, which in turn slides in block 74 to which triangular plate 77 is pivotally connected. Movement of plate 77 will cause a corresponding movement of grooved bar 80 and indicator 107.

Movement of the other stylus 44' will be transmitted to plate 92, which is connected to the multiplying bar 57 through rollers 95 and 98, to move said bar 57 and thereby impart movement to member 66.

From the foregoing it will be seen that I have provided a calculating device which will make a complete calculation, the final figure derived at being the actual volume of fluid which has passed through a meter in a given time, and not a figure which must be subjected to further mathematical steps in order to obtain the final answer desired. With my invention I have accomplished all that the prior art has done and more; using fewer parts and simpler construction. My device is not dependent on any frictional contact which may cause serious errors in the calculation. The counting device contacts the chart face and even should the chart slip in respect to the chart table no error would be caused.

Changes in form, proportion and details of construction may be resorted to without departing from the spirit of my invention and I reserve the right to make all such changes as come within the scope of the principles covered by this specification and the following claims.

What I claim as new and desire to secure by Letters Patent is:

1. A calculating machine of the class described comprising a chart table adapted to receive an orifice meter chart, styli movably related to the chart table, a multiplying member responsive to movements of the styli, square root extracting means actuated by said multiplying member, and a counting device engaging the chart table and actuated thereby.

2. The structure as specified in claim 1, said counting device being movable diametrically across the chart.

3. The structure as specified in claim 1, said counting device being movable diametrically across the chart by the square root extracting means simultaneously with the actuation of said counting device by the chart table.

4. A calculating machine of the class described comprising a chart table adapted to receive an orifice meter chart, driving means for the chart table, styli movably mounted in relation to the chart table, a multiplying member responsive to movements of the styli, square root extracting means actuated by said multiplying member, a counting device frictionally engaging the chart on the table and actuated by rotation of said chart table, and means for stopping the rotation of the chart table when it has completed one revolution.

5. The structure as specified in claim 1, the movement of said styli in relation to the chart table being in an arc parallel to the time arc on the chart.

6. The structure as specified in claim 1, including arcuate guide members for carrying said styli.

7. The structure as specified in claim 1, including arcuate guide members for carrying said styli, the arc in said guide members corresponding to the time arc of the chart.

8. The structure as specified in claim 1, including interchangeable arcuate guide members for carrying said styli, the guide arc of said guide members corresponding to the curve of the time arc of the chart being computed.

9. A calculating machine of the class described comprising a chart table adapted to receive an orifice meter chart, rack mounted styli movably related to the chart table, means for moving the styli on their respective racks, a multiplying member responsive to movements of the styli, square root extracting means actuated by said multiplying member, a counting device engaging the chart table and actuated thereby.

10. The structure as specified in claim 1, including error adjustment means for changing the relation of the styli with the multiplying member prior to calculating operation of the machine.

11. A calculating machine of the class described comprising a chart table adapted to receive an orifice meter chart, a plurality of stylus blocks movably related to the chart table and carrying styli therein, a multiplying member responsive to movements of the stylus blocks, square root extracting means actuated by said multiplying member, a counting device engaging the chart table and actuated thereby.

12. A calculating machine of the class described comprising a chart table adapted to receive an orifice meter chart, a plurality of stylus blocks and stylus carriers movably related to the chart table, styli carried in said carriers, a multiplying member responsive to movements of the stylus carriers, square root extracting means actuated by said multiplying member and a counting device engaging the chart table and actuated thereby.

13. The structure as specified in claim 12, including error adjustment means between the stylus blocks and the stylus carriers for changing the relation between the styli and the multiplying member prior to calculating operation of the machine.

14. The structure as specified in claim 12, said stylus blocks being mounted for slidable movement whereby the relation of the styli to the chart may be changed.

15. The structure as specified in claim 12, said stylus carriers being slidably engaged by said stylus blocks.

16. The structure as specified in claim 12, including motion correction means between the stylus blocks and the stylus carriers.

17. The structure as specified in claim 12, said stylus carriers being slidably engaged by said stylus blocks, and motion correction means between the stylus blocks and the stylus carriers.

18. The structure as specified in claim 12, said stylus blocks being rack mounted whereby the relation of the styli with the chart table may be changed.

19. The structure as specified in claim 12, said stylus carriers being slidably mounted in arcuate guides whereby the styli will follow the curve of the time arc on the chart.

20. The structure as specified in claim 12, said stylus carriers being slidably mounted in interchangeable arcuate guides whereby the guide used will determine the path of the styli in relation to the time arc of the chart.

21. The structure as specified in claim 1, including multiplying member actuating means controlled by movements of the styli to set multiplying member in multiplying position and cause multiplying action thereof.

22. A calculating machine of the class described comprising a chart table adapted to receive an orifice meter chart, styli movably related to the chart table, a slidably and pivotally movable multiplying member responsive to movements of the styli, square root extracting means actuated by said multiplying member, a counting device engaging the chart table and actuated thereby.

23. The structure as specified in claim 22, one of said styli being adapted to cause a slidable movement of said multiplying member and the other styli adapted to cause a pivotal movement of said multiplying member.

24. A calculating machine of the class described comprising a chart table adapted to receive an orifice meter chart, styli movably related to the chart table, a multiplying member responsive to movements of the styli, a square root extracting member, actuating means operable by the multiplying member for actuating the square root extracting member, a counting device engaging the chart table and actuated thereby.

25. The structure as specified in claim 24, said multiplying member being slidably related to the square root extracting member actuating means.

26. The structure as specified in claim 24, said multiplying member being slidably related to the square root extracting member actuating means, one of said styli being adapted to cause the multiplying member to slide in said square root extracting member actuating means without disturbing the square root member, the other styli adapted to cause a pivotal movement of the multiplying member to cause multiplication and to cause square root extracting member to function.

27. The structure as specified in claim 1, one of said styli adapted to move multiplying member into multiplying position and the other of said styli being adapted to cause multiplying action of said multiplying member.

28. A calculating machine of the class described comprising a chart table adapted to receive an orifice meter chart, styli movably related to the chart table, a multiplying member responsive to movements of the styli, a counting device engaging the chart table and actuated thereby, square root extracting means intermediate the multiplying member and the counting device and actuated by said multiplying member.

29. The structure as specified in claim 28, said counting device being movable diametrically across the chart by the square root extracting means simultaneously with the actuation of said mounting device by the chart table.

30. A calculating machine of the class described comprising a chart table adapted to receive an orifice meter chart, styli movably related to the chart table, a multiplying member responsive to movements of the styli, square root extracting means actuated by multiplying movement of said multiplying member, a counting device engaging the chart table and actuated thereby.

31. The structure as specified in claim 1, said square root extracting means including a pivoted guide member proportionately responsive to movements of the multiplying member.

32. The structure as specified in claim 1, said square root extracting means including a pivoted guide member proportionately responsive to movements of the multiplying member, two guides on said pivoted guide member, one guide for actuating the guide member upon multiplying action of the multiplying member, the other guide for motivating the counting device in relation to the chart table.

33. The structure as specified in claim 1, and coefficient mechanism whereby the coefficient may be applied to the calculating machine to derive a complete calculation.

34. The structure as specified in claim 1, and coefficient mechanism intermediate the square root extracting means and the counting device.

35. The structure as specified in claim 1, and coefficient mechanism adapted to change the relation of movement of the counting device with the chart table prior to calculation process.

36. The structure as specified in claim 1, and coefficient mechanism comprising adjustment means intermediate the square root extracting means and the counting device.

37. The structure as specified in claim 1, including coefficient mechanism, the movement of said mounting device being adjustably related to the chart table by predetermined setting of the coefficient mechanism.

WILLIAM F. MARTIN.